United States Patent [19]

Witt

[11] 3,862,104

[45] Jan. 21, 1975

[54] LARGE PORE SILICA GEL CATALYSTS

[75] Inventor: Donald R. Witt, Bartlesville, Okla.

[73] Assignee: Phillips Petroleum Company, Bartlesville, Okla.

[22] Filed: Oct. 15, 1973

[21] Appl. No.: 406,370

Related U.S. Application Data

[63] Continuation-in-part of Ser. No. 216,236, Jan. 7, 1972, abandoned.

[52] U.S. Cl............ 260/94.9 D, 252/458, 423/338
[51] Int. Cl............................ C08f 1/66, C08f 3/02
[58] Field of Search............... 260/94.9 D; 252/458; 423/338

[56] References Cited
UNITED STATES PATENTS

| | | | |
|---|---|---|---|
| 2,395,524 | 2/1946 | Weiser et al. | 423/338 |
| 2,978,298 | 4/1961 | Wetzel et al. | 423/338 |
| 3,130,188 | 4/1964 | Hogan | 260/94.9 D |
| 3,165,379 | 1/1965 | Schwartz | 423/338 |
| 3,485,771 | 12/1969 | Horvath | 260/94.9 D |
| 3,622,521 | 11/1971 | Hogan | 260/94.9 D |
| 3,801,705 | 4/1974 | Krekeler et al. | 423/338 |

FOREIGN PATENTS OR APPLICATIONS

| | | | |
|---|---|---|---|
| 1,007,722 | 10/1965 | Great Britain | 260/94.9 D |

Primary Examiner—Joseph L. Schofer
Assistant Examiner—A Holler

[57] ABSTRACT

A method of producing the silica-containing support for a polymerization catalyst which involves precipitating the silica hydrogel employing an ammonium salt and removing the water from the hydrogel by employing an oxygen-containing organic compound.

8 Claims, No Drawings

LARGE PORE SILICA GEL CATALYSTS

This is a continuation-in-part of copending application, Ser. No. 216,236, filed Jan. 7, 1972, now abandoned.

This invention relates to the production of polymerization catalysts.

In one of its more specific aspects, this invention relates to the production of large pore supports suitable for use in supported olefin polymerization catalysts.

The polymerization of 1-olefins, the catalysts and the methods for doing so are well known and are discussed in such patents as U.S. Pat. No. 2,825,721 and British Pat. No. 853,414, both of which are incorporated herein by reference. Such processes employ catalysts which comprise chromium on a support selected from the group consisting of silica, silica-alumina, zirconia and thoria, at least a portion of the chromium being in the hexavalent form at the initial contacting of hydrocarbon with the catalyst.

Various modifications have been made to such catalysts. One of these modifications concerns the incorporation into the catalyst of adjuvants, such as titanium. Other modifications involve the nature of the support, such as its pore size. The present invention concerns modification related to the production of the support.

The present invention concerns the formation of a silica-containing support as a hydrogel. The hydrogel is produced by introducing an alkali metal silicate solution into an ammonium salt solution capable of neutralizing or reacting with the basic sodium silicate. The silica is produced in the form of a hydrogel.

The hydrogel so produced is aged, washed and mixed with a normally liquid, oxygen-containing organic compound. The water and the organic compound are then removed to produce a substantially water-free support. This support is then impregnated with chromium preferably in the form of a chromium compound in a hydrocarbon diluent and, optionally, titanium and activated to produce a catalyst active in olefin polymerization. The titanium can be incorporation in the catalyst by adding the titanium compound, reducible to its oxide upon calcination, to the sodium silicate solution or to the ammonium salt solution. Alternatively a chromium compound soluble in the liquid oxygen-containing organic compound can be used to impregnate the hydrogel prior to drying. Suitable compounds include chromium trioxide, chromium acetate, chromium nitrate and chromium sulfate. Chromium trioxide is preferred.

Any ammonium salt capable of neutralizing or reacting with the basic sodium silicate solution can be employed. Such salts include ammonium nitrate, ammonium sulfate, ammonium chloride, ammonium fluoride, ammonium fluoborate, ammonium silicofluoride, ammonium acetate, ammonium phosphate and ammonium chlorate. Acidic salts such as ammonium sulfate, ammonium chloride and ammonium nitrate are preferred. Similarly, any alkali metal silicate can be employed although sodium silicate is preferred. The ammonium salt and alkali metal silicate are preferably employed in the form of their aqueous solutions, these solutions being of any concentration such as to produce a hydrogel not containing an inordinate amount of water.

The invention will be explained hereinafter in terms of employing ammonium sulfate and sodium silicate as exemplary of this invention but without intent to limit the invention thereto.

The sodium silicate is introduced into the ammonium salt solution and the composite is mixed. The concentration of the silicon dioxide in the hydrogel will be within the range of from about 2 to about 12 weight percent and the pH of the gel is within the range of about 3 to about 10. Mixing the solutions at room temperature is satisfactory.

After gelling, the mixture is aged at a temperature within the range of from about 65°F to about 200°F for a period of about one hour or longer and filtered. The gel is washed with water and then washed a plurality of times with a water solution containing 0.5 weight percent ammonium nitrate and finally a plurality of times with distilled water to reduce the sodium ion content to less than about 0.1 weight percent.

Water is then removed from the hydrogel by washing with a normally liquid oxygen-containing organic compound which is soluble in water or by azeotropic distillation employing such an organic compound. Suitable compounds include methyl isobutyl ketone, ethyl acetate, sec-butyl alcohol, n-propyl alcohol, isopropyl acetate, and the like. Generally, about 1.2 to about 2 parts by weight of the organic compound is employed per part by weight of the hydrogel.

The substantially dried silica xerogel so produced is then modified by the inclusion of a chromium compound in an amount to give usually about 1 percent but up to about 10 weight percent chromium oxide in the calcined catalyst and, optionally, with any perturbing agent by methods known in the art, and the composite is activated by methods also known in the art to produce a catalyst active in olefin polymerization.

If it is desired to incorporate a perturbing agent, such as titanium, into the catalyst prior to the recovery of the xerogel, this can be done by employing a compound of titanium, this compound being introduced into either of the solutions employed in forming the hydrogel. Suitable titanium compounds include water soluble compounds such as $K_2TiO(C_2H_4)_2 \cdot 2H_2O$ or $(NH_4)_2TiO(C_2H_4)_2 \cdot H_2O$. Alternatively a titanium compound such as titanium isopropoxide can be added in a hydrocarbon diluent after recovery of the xerogel.

The invention is illustrated in the following examples:

EXAMPLE I 129 g of 44.1 percent sodium silicate in 121 g of water were added to 19.8 g of ammonium sulfate in 250 g of water. A gel comprised of 2.9 percent $SiO_2$ was formed at a pH of 9.4.

The gel was aged 4 hours after which it was washed, filtered, and to it were added about 400 g of ethyl acetate.

The mixture was azeotropically distilled to remove the water after which the ethyl acetate was removed by evaporation. The substantially dry solid was impregnated with a hydrocarbon solution of t-butyl chromate and after evaporation of the solvent, the solid was activated at 1,600°F to obtain a catalyst containing about 1 weight percent chromium. This catalyst was employed in the polymerization of ethylene under conventional polymerization conditions. The surface area of the catalyst was 383 m/g and its pore volume was 2.56 cc/g.

By polymerization there were produced 4,950 g of ethylene polymer per g of catalyst. The polymer had a melt index of about 4.1.

These data indicate that a catalyst capable of producing polyethylene having a high melt index at high productivities is produced by this invention.

EXAMPLE II

To a first solution comprising 5.5 g of $K_2TiO(C_2H_4)_2 \cdot 2H_2O$ in 250 g of water was added a second solution comprised of 250 g of 44.1 percent sodium silicate in 250 g of water. The titanium-silicate mixture so formed was added to a solution comprising 25 g of $(NH_4)_2SO_4$ in 500 g of water.

The mixture was maintained at about 80°C and at a pH of about 9.5 for a period of about 4 hours after which the hydrogel was washed and recovered as a xerogel by azeotropic distillation with ethyl acetate. The xerogel was then impregnated with chromium according to prior art methods.

This catalyst, comprising 1 weight percent chromium and 2.5 weight percent titanium on silica, was employed in the polymerization of ethylene at conventional operating conditions and produced an ethylene polymer having a melt index of 4.5 at a yield of 5,560 g of polymer per g of catalyst.

While in the above example the titanium compound was incorporated in the sodium silicate, it can, with equally successful results, be incorporated in the aqueous solution of the ammonium salt.

It will be evident from the foregoing that various modifications can be made to the method of this invention. Such, however, are considered to be within the scope thereof.

What is claimed is:

1. A method for polymerizing olefins which comprises contacting said olefins with a catalyst produced by:
   a. introducing an alkali metal silicate solution into a solution comprising an ammonium salt to form a silica hydrogel;
   b. removing water from said hydrogel by azeotropic distillation with an oxygen-containing organic compound to produce a substantially water-free silica-containing composition;
   c. introducing a chromium compound into said silica;
   d. recovering said silica-containing composition, thus modified with chromium; and
   e. subjecting said thus recovered composition to calcination to activate same.

2. The method of claim 1 wherein said chromium compound is introduced into said substantially water-free silica-containing composition after said azeotropic distillation.

3. The method of claim 2 in which said chromium compound is introduced into said water-free silica-containing composition by impregnating same with a hydrocarbon solution of tertiary butyl-chromate.

4. The method of claim 2 in which said salt is selected from the group consisting of ammonium nitrate, ammonium sulfate, ammonium chloride, ammonium fluoride, ammonium fluoborate and ammonium silicofluoride.

5. The method of claim 4 in which silica hydrogel is produced at a pH within the range of from about 3 to about 10, the silicon dioxide content of said gel being within the range of from about 2 to about 12 weight percent.

6. The method of claim 4 in which said solution of said alkali metal silicate or said solution comprising an ammonium salt contains a titanium compound reducible to the oxide upon calcination.

7. The method of claim 4 in which said ammonium salt is ammonium sulfate.

8. The method of claim 6 in which said ammonium salt is ammonium sulfate and said titanium compound is $K_2TiO(C_2H_4)_2 \cdot 2H_2O$.

* * * * *